June 21, 1960  R. T. CASSADY  2,941,573
METHOD OF AND APPARATUS FOR REGULATING CORRUGATING
MACHINES (VARIABLE HEAT DOUBLE FACER)
Filed March 28, 1958  3 Sheets-Sheet 2

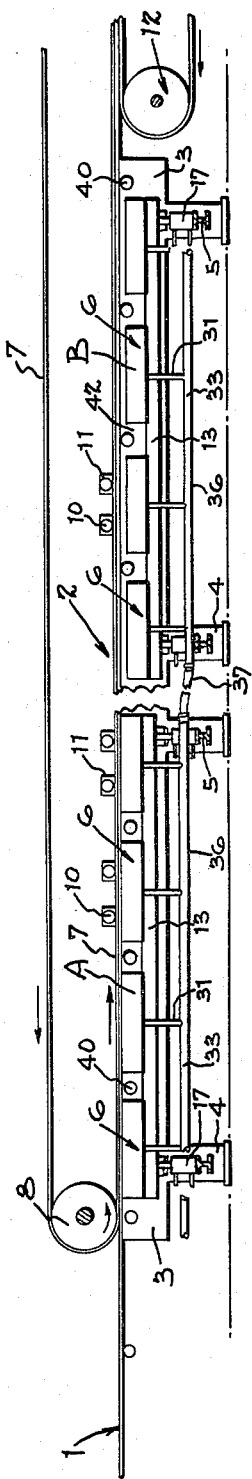

INVENTOR.
Robert T. Cassady.
BY
Wood, Herron & Evans
ATTORNEYS.

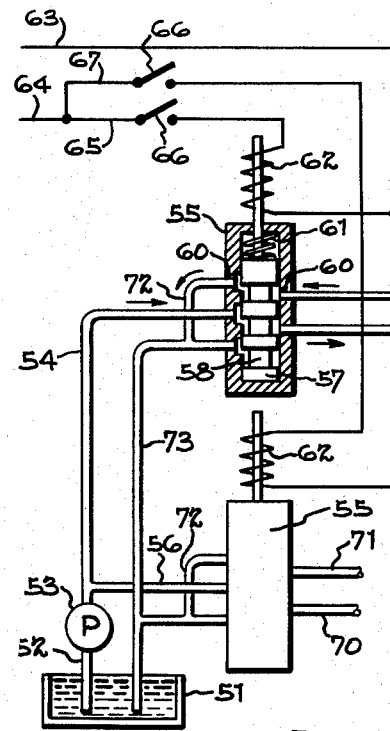

2,941,573
Patented June 21, 1960

2,941,573

METHOD OF AND APPARATUS FOR REGULATING CORRUGATING MACHINES (VARIABLE HEAT DOUBLE FACER)

Robert T. Cassady, 6604 Hudson Parkway, Amberly Village, Cincinnati 13, Ohio

Filed Mar. 28, 1958, Ser. No. 724,703

15 Claims. (Cl. 154—32)

This invention relates to the manufacture of corrugated paper board and is directed particularly to improvements in the method and apparatus used in the production of this material.

One of the primary objects of the invention has been to provide a method by which the drying heat, which is applied to the freshly glued corrugated board, may be regulated rapidly and precisely in accordance with the changing requirements of the material as it advances lineally in the course of manufacture, thereby to increase substantially the flexibility of heat application on conventional corrugating equipment.

The corrugated paper board to which the present invention is addressed, is of the type used extensively in the fabrication of containers, particularly packing cases for the packaging and shipment of merchandise in bulk quantity. The most widely used corrugated stock, which is known in the trade as double-face single-ply board, consists of a corrugated sheet of paper stock having a pair of external liner sheets, also of paper stock, adhesively secured to the flutes of the corrugated sheet at opposite sides.

The corrugated board is manufactured at a high production rate on corrugating machines which are well known in the paper board industry. In general, a typical machine comprises a corrugating and gluing section, a heating or facing section, and a cooling section. In the manufacture of single-ply double-face board, three continuous sheets of paper stock are fed lineally through the three sections of the machine. During passage through the first section, corrugations are formed transversely across the intermediate sheet, then liquid adhesive is applied, usually to the tops of the flutes or ridges of the corrugated sheet. After the adhesive is applied, the liner sheet is brought into contact with the glue-coated flutes, then the assembled sheet, now consisting of one liner and a corrugating board, is advanced over the glue machine where the outer liner is applied to the opposite side of the corrugated sheet. The combined board, now consisting of an inner liner, a corrugated board and an outer liner, is now advanced over the heating section.

The present invention is directed to improvements in the conventional machine for regulating the temperature of the board during its passage through the above-mentioned heating section.

The liquid glue, which bonds the sheets together, is of a type which is set or hardened by the application of heat to the assembled board as it advances through the heating section of the machine. For example, a vegetable glue, such as a mixture of cornstarch and water, is widely used as the bonding agent. This mixture becomes gelatinized, that is, it is converted to an adhesive upon being subjected to heat, the minimum temperature being predetermined by the glue formula. It must be remembered, however, that the heat contained in the platens is usually far in excess of the minimum heat needed to gelatinize the glue, inasmuch as the platens must dissipate the moisture given off by the glue, as well as the moisture in the paper board itself. Other glue mixtures may require higher or lower temperatures, but in all cases, the heat must be below a critical temperature at which the paper fibers are apt to be damaged on the conventional double facer. This can be done only by speeding up or slowing down the flow of material over the machine.

During lineal advancement through the heating section of the machine, the freshly glued board is in sliding contact with a series of hot platens or plates, which are heated by steam pressure to the temperature range necessary to set the glue, as indicated above. As the freshly glued board enters the heating section, it is in a somewhat soft, pliable condition due to the moisture present in the adhesive and also due to atmospheric moisture absorbed in the paper stock. In order to flatten the board, it is held down upon the platens by a ballast belt which rests upon the upper liner sheet and advances lineally at the same speed as the corrugated board. As the heat acts upon the adhesive, it also drives off the moisture from the combined corrugated and liner sheets, causing the finished board to issue from the downstream end of the heating section in stiff, flat condition. After passing from the heating section, the board advances through the cooling section where its temperature is reduced to a point at which the material can be handled by the operators without discomfort. The corrugated board is ready for use upon issuing from the cooling section.

The control of the temperature which is applied to the board as it passes through the heating section must be regulated within fairly close limits according to the character of the sheet material. For example, different thicknesses of paper stock may be utilized in manufacturing various grades of board; the quantity of moisture absorbed in the sheets may vary during a given run, also the quality of the paper stock itself may vary. If too much heat is applied to a given sheet material, the paper fibers may be damaged, causing the board to issue from the heating section in brittle condition; too much heat also may cause the board to shrink transversely or longitudinally. Excess heat in other cases may cause the board to warp or curl. In each of these examples, the material is rendered unfit for use.

In the conventional corrugating machine, the temperature acting upon the corrugated board can be regulated only by changing the operating speed of the entire machine. Controlling the temperature of the hot plates themselves by regulating the steam supply is not feasible due to their mass. Accordingly, the machine is provided with variable speed motors interconnected with switches at a centralized control panel, permitting the operator to vary the rate of advancement of the material through the entire machine to obtain the proper drying action.

The modern corrugating machine advances the board at a maximum speed in the neighborhood of 750 feet per minute; the length of the drying section naturally establishes the maximum rate. However, the normal rate of advancement for a given quality of board may be considerably less than maximum. Thus, if a smaller amount of heat is required during the run, the operator may speed up the entire machine to decrease the board temperature, and if more heat is required, the operator may slow down the machine. Since the speeds have fixed upper and lower limits, the temperature ranges obtainable are correspondingly limited and cannot be made to meet all conditions which may arise during a given run of material. Moreover, in view of the high rate of advancement of the board, it will be obvious that the waste of material may be very great before the speed of the machine may be regulated to meet a given temperature requirement.

The rapid temperature control of the heating section, which is the primary object of this invention, is carried out by modifying the conventional heating section in such manner that the heated platens may be shifted toward or away from the advancing corrugated board in accordance with the requirements of the material, without substantially changing the speed of the corrugating machine. (In the conventional heating section, the platens are mounted at a common level in a fixed plane, and they are spaced apart from one another along the length of the machine.) Since the platens can be shifted rapidly to their active or inactive positions, the temperature changes can be carried out very quickly as the need arises during a run of board.

A further objective has been to provide a structure wherein the temperature may be varied selectively along the length of the heating section to meet the temperature requirements of the various grades of material being acted upon. By way of example, certain groups of platens along the length of the machine may be raised to active position, while other groups may be lowered to inactive position. This makes it possible to obtain a wide range of temperatures at any given speed, for manufacturing various types of board at the most efficient production rate. According to this aspect of the invention, the platens are segregated singly or into groups along the length of the machine and each single platen or group of platens is provided with individual power means for shifting motion selectively to active or inactive position. Manual control devices for regulating the power means preferably are mounted on the control panel of the machine, thereby permitting the operator conveniently to shift the platens and correlate the speed of the machine to obtain the most efficient control of the advancing material. The positioning of the platens may be controlled automatically with the variable speed of the machine.

Although the invention is disclosed in relation to the manufacture of single-ply double-face board, the same principles are also applied to the manufacture of corrugated board of two-ply or three-ply construction; the same principles also may be utilized in the manufacture of wall board and other materials which require the application of variable heat. It will be understood that the greater temperature requirements of the thicker composite boards may require a reduction in the speed of advancement, the temperature being regulated by shifting the platens as outlined above.

As a modification of the apparatus outlined above, but involving the same principles, means may be provided for raising and lowering the corrugated board with respect to the heated platens for temperature regulation instead of shifting the platens. For example, in the type of heating section disclosed herein, the platens may be mounted in a fixed plane in the customary way and rollers, which are located between the platens, may be mounted for vertical motion, with power and control means for shifting them as outlined above. In this arrangement, the rollers occupy the normal plane when in lowered position, with the board in sliding contact with the platens. When shifted upwardly, the rollers lift the board upwardly with respect to the platens to reduce the heat transfer.

The present method, and an apparatus for carrying out the invention are disclosed in greater detail in the following description, taken in conjunction with the drawings.

In the drawings:

Figure 1 is a diagrammatic side view of the drying section of a corrugating machine embodying the principles of the invention.

Figure 2 is an enlarged fragmentary view taken from Figure 1, showing in greater detail the groups of shiftable hot plates or platens shifted to their elevated and lowered positions.

Figure 7 is an enlarged side view of a typical single-ply double-face corrugated board.

Figure 8 is an enlarged side view of a double-ply corrugated board.

Figure 9 is an enlarged side view of a triple-ply corrugated board.

Figure 10 is a diagrammatic view of a typical control system which may be utilized in shifting the hot plates to their active or inactive positions.

Figure 11 is a cross sectional view similar to Figure 4, showing a modified apparatus in which the hot plates are mounted in a fixed plane, the lower guide rollers being shiftable vertically, thereby to raise or lower the corrugated board relative to the hot plates.

Figure 12 is an enlarged sectional view taken along line 12—12 of Figure 11, further detailing the modified structure.

*General arrangement*

Figure 3:
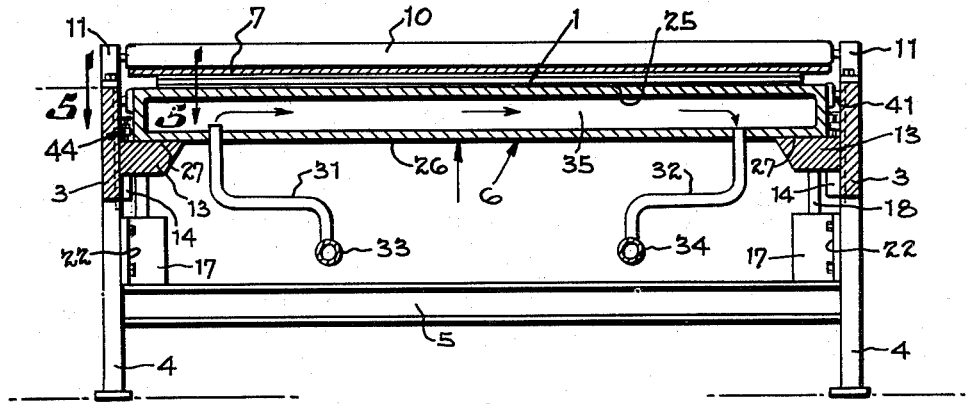
Figure 3 is a sectional view taken along line 3—3 of Figure 2, further illustrating the structure of the shiftable hot plates, with the plates in elevated or active position.
Figure 4:
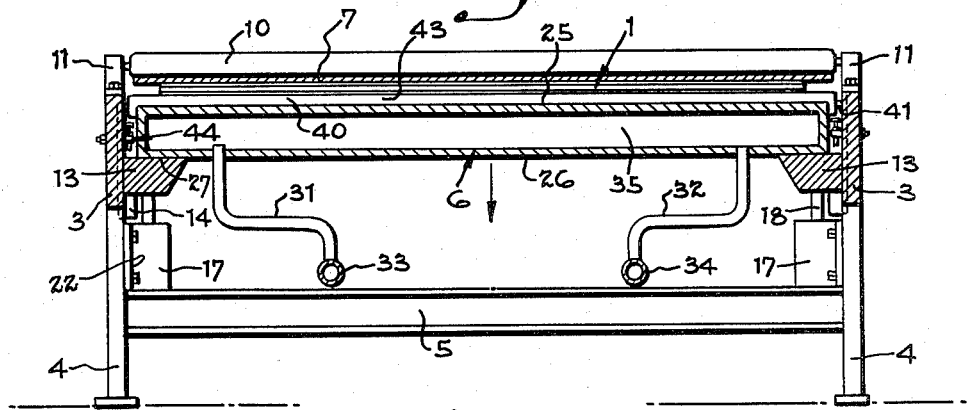
Figure 4 is a sectional view taken along line 4—4 of Figure 2, showing the hot plates shifted to the lowered or inactive position.

As noted above, the conventional corrugating machine essentially comprises a corrugating and gluing section, a heating or facing section and a cooling section. Since the corrugating and gluing section forms no part of the invention and is well known in the art, it has been omitted from the drawings. As shown in Figure 1, a freshly glued and assembled corrugated sheet, indicated at 1, is shown issuing from a typical corrugating and gluing section and advancing through the facing or drying section, which is indicated generally at 2. The drying section, shown diagrammatically in Figure 1, represents a conventional structure which is provided with suitable apparatus for carrying out the principles of the present invention. The length of the drying section largely determines the speed of the over-all machine and may be in the neighborhood of 100 feet; hence, only the end portions of the structure are shown in Figure 1.

In general, the drying section 2 comprises a pair of longitudinal side plates 3—3 (Figures 1 and 3), preferably of sectional construction, each section being supported by standards or legs 4 which rest upon the floor. The side plates are held in spaced relationship by cross members 5, in the form of channel irons extending transversely and joined to the legs at opposite sides. The various components of the drying section are mounted between the side plates 3—3.

As the freshly glued corrugated sheet 1 advances through the drying section, it rests in sliding contact with the hot plates or platens 6 which extend transversely between the side plates of the machine. The corrugated sheet is held in contact with the platens by a ballast belt 7 having its forward end passing over a roller 8 at the receiving end of the heating section. A series of ballast rollers 10, suitably journalled in bearing blocks 11, rest upon the lower run of the ballast belt to hold the belt under regulated pressure upon the corrugated board. The ballast belt is driven in the direction indicated by the arrows at a speed corresponding to the speed of advancement of the corrugated board. The finished board issues from the downstream end of the heating section in stiff flat condition and passes to the cooling section, which is indicated generally at 12 in Figure 1.

The heating section so far described, consisting essentially of the heated platens and ballast belt structure, is conventional, the length of the heating section and the temperature of the platens being sufficient to completely dry the freshly glued corrugated board as it advances lineally along the platens at a given speed. It will be understood at this point, that in the conventional heating section, the platens are mounted rigidly at a common plane and that the temperature, which acts upon the corrugated board, is controlled by accelerating or decelerating the entire machine, consisting of the corrugating and gluing section, heating section, and cooling section.

Heat regulating apparatus

According to the apparatus selected to illustrate the principles of the invention (Figures 1–4) the platens 6 are shifted relative to the advancing corrugated board by means of hydraulic cylinders regulated by an electrical control system, the arrangement being such that the operator may shift the platens to their active or inactive positions quickly in accordance with the changing temperature requirements of the advancing board. In the example illustrated, the platens are segregated into groups of four each along the heating section as indicated at A and B in Figures 1 and 2. Each group of platens is provided with an individual set of hydraulic cylinders for selective regulation by the operator. It will be understood that, if desired, each platen may be provided with power means for individual actuation instead of group control. It will also be understood that other power devices may be utilized for shifting the platens, for example, air cylinders or electric motors of suitable design, the power devices being provided with control switches or the like.

Figures 5, 6:
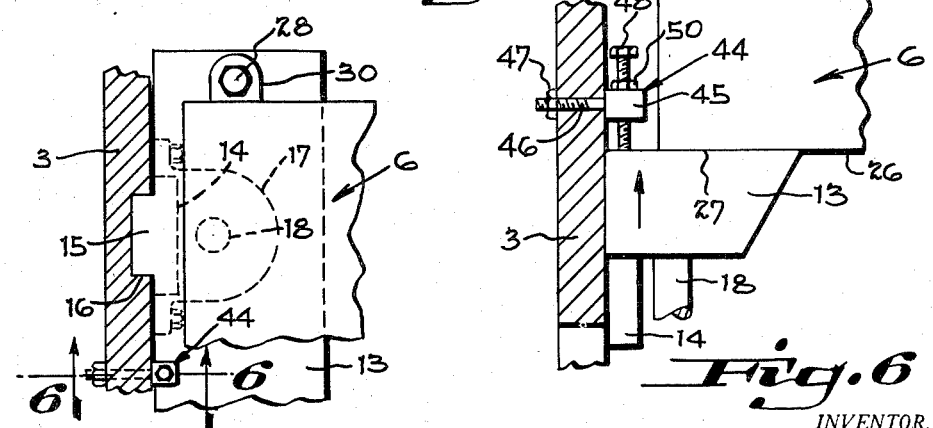
Figure 5 is an enlarged sectional view taken along line 5—5 of Figure 3, detailing the guide structure of the shiftable hot plates.
Figure 6 is an enlarged fragmentary sectional view taken along line 6—6 of Figure 5, further detailing the guide structure and stop device which regulates the plane of the hot plates in the elevated position thereof.

Described with reference to Figures 1–4, each group of platens is mounted for collective actuation upon respective pairs of opposed slide rails 13—13, which are mounted for vertical shifting motion along the side plates 3 of the heating section. As best shown in Figure 5, the opposite ends of each slide rail are provided with guide blocks 14—14, each including an outwardly facing shoe 15 slidably interfitted in a vertical slide way 16 formed in the respective side plates 3. The opposite ends of each slide rail 13 are thus guided for vertical motion relative to the side plates 3.

Each slide rail 13 is actuated by a pair of hydraulic cylinders 17—17 having piston rods 18 projecting vertically from pistons 20 (Figure 2). The upper ends of the piston rods 18 may be threaded into or otherwise attached to the opposite end portions of the slide rails as at 21. The hydraulic cylinders 17 are seated upon the cross members 5, and the cylinders preferably are provided with flanges 22 which are bolted or otherwise secured to the legs 5 of the frame structure (Figure 3).

Hydraulic fluid is supplied to the cylinders 17, for raising and lowering the respective groups of platens, by way of branch conduits 23 and 24, which are in communication with suitable control valves, as explained later. It is to be understood at this point, that the hydraulic fluid is supplied simultaneously to the set of four cylinders of any selected group of platens, such that the pistons all move the uniform rates to maintain the group of platens in a level plane as the group is shifted to its elevated or lowered position. Since the opposite ends of the platens are attached rigidly to the slide rails 13, the platens confine the bearing shoes 15 in sliding engagement with the slide ways 16 of the side plates.

Each platen 6 comprises a closed chamber of rectangular shape which may be formed of cast iron (Figure 3). The upper wall of the platen is machined as at 25 to provide a smooth surface for sliding contact with the corrugated board; the lower wall 26 has its opposite ends seated as at 27 upon the opposed slide rails 13—13. The opposite ends of the platens are rigidly attached to the cross rails, for example, by means of bolts 28 passing through lugs 30 which project outwardly from opposite sides of the respective platens (Figure 5).

Steam pressure is supplied to each platen by a steam supply conduit 31 and is exhausted by way of an exhaust conduit 32. As best shown in Figure 3, the supply conduit 31 extends from a header 33 extending longitudinally of the machine; the exhaust conduit 32 communicates with an exhaust header 34 extending parallel with the supply header 33. The headers 33 and 34 are in communication with a conventional steam generating system (not shown). The supply and exhaust conduits 31 and 32 pass through the lower wall 26 adjacent the opposite ends of the platen, such that the steam pressure flows from the conduit 31, across the interior 35 of the platen and through the exhaust conduit 32, as indicated by the arrows (Figure 3).

In order to allow the individual groups of platens to move vertically, the steam headers 33 and 34 are divided into sections as indicated at 36, one section for each group of platens, the spaced ends of adjacent sections being connected together by flexible hose connectors 37. The flexible connectors, which are of commercial design, include couplers 38 at opposite ends, which are connected to the adjacent ends of the headers. The flexible connectors are capable of withstanding the maximum steam pressure of the system and are sufficiently resilient to allow the individual groups of platens and header sections 36 to be shifted vertically relative to one another, as indicated at A and B in Figure 2. As shown in this view, the group A is in its elevated or active position and the group B is in lowered or inactive position.

As best shown in Figure 2, each group of platens is shiftable relative to a series of idler rollers 40, which have their opposite ends rotatably journalled as at 41 (Figure 3) in the side plates 3—3. The idler rollers 40 are located between the platens, which are spaced apart as at 42 to accommodate the rollers. The rollers 40 are located to track in a horizontal plane which is contiguous to the machined upper surface 25 of the platens in their elevated or active position (group A, Figure 2). The arrangement is such that the corrugated board 1 is in sliding contact with the top surface 25 of the elevated platens, with the board slightly above or tracking lightly upon the rollers. When the platens are lowered (group B, Figure 2), the advancing board is supported in its normal plane by the rollers 40, the upper surface 25 of the platens being spaced downwardly as at 43 from the surface of the board. Accordingly, when the platens are elevated, the ballast belt 7 holds the corrugated board in sliding contact with the platens and aids in advancing the board by frictional contact with its upper surface; when the platens are lowered, the idler rollers 40 support the board while the ballast belt continues to advance the board along the rollers 40.

In order to provide the loading effect, the ballast rollers 10 are free to float vertically, within limits, such that the weight load of the rollers is imposed upon the ballast belt. It will be understood that the operating plane of the ballast belt and its rollers will vary in accordance with the thickness of the corrugated board or other material running through the drying section. For this purpose, the journal blocks 11 are provided with means (not shown) for regulating the elevation of the rollers and, if necessary, for regulating the amount of pressure imposed by the rollers upon the belt in accordance with the requirements of various sheet materials.

In order to establish accurately the operating plane of the platens relative to the ballast belt, each group of platens includes adjustable stops, indicated generally at 44, engageable with the platen structure in its elevated position. As best shown in Figures 5 and 6, each stop comprises a lug 45 having a threaded shank 46 passing through the side plates 3 and anchored by a nut 47 threaded upon the outer end of the shank. A vertical adjustment screw 48 is threaded through the lug 45 and is locked in its adjusted position by a lock nut 50. The lower end of the adjustment screw 48 contacts the upper surface of the slide rail 13 (Figure 6) in the elevated position of the platen section. The stops 44 are located in pairs along the opposed side rails 3 in position to engage the opposite ends of each slide rail and the screws are adjusted individually to locate the top surface of the collective platens accurately relative to the plane of travel of the corrugated sheet. Accordingly, the platens are locked rigidly in elevated position by the stops which resist the upward thrust of the hydraulic cylinders.

Hydraulic control system

The control system shown in Figure 10 has been selected to illustrate a suitable, manually operated arrangement for regulating the board temperature along the entire length of the heating section. As noted earlier, the conventional corrugating machine is provided with a centralized console or control panel having manually operated switches which permit the operator to regulate the variable speed motors of the complete machine, thereby to control, at least partially, the amount of heat applied to the board. The control system for selectively actuating the platens includes control switches which also may be mounted upon the control panel in order that the operator may correlate the board temperature and speed of advancement conveniently. It will be understood that, in practicing the invention, the speed is selected in accordance with the thickness and other constant factors of a given material, the platen shifting apparatus being activated in accordance with factors which vary during the run of material. As a general rule, a single-ply sheet will be run at a given speed, two-ply and three-ply sheets being run at slower speeds because the greater thickness of the composite sheet material requires a greater period of time for heat penetration.

Referring to Figure 10, the hydraulic system includes a sump or reservoir 51 having an intake conduit 52 communicating with a motor-driven hydraulic pump 53. A delivery conduit 54 leads from the pump to a solenoid-operated reversing valve 55 which controls the flow of fluid pressure to the four hydraulic cylinders 17 of the first group of platens, indicated at A. It will be understood that an individual reversing valve 55 is provided for each group of platens, each valve being in communication with the delivery conduit 54. Thus, as shown in the diagram, a valve 55 for group B is interconnected with the delivery conduit 54 by a branch conduit 56, the remaining valves being omitted for the sake of simplicity.

The reversing valve 55 is of a conventional type including a shiftable plunger or spool 57 having a series of grooves 58 which provide communication across the ports 60 at opposite sides of the valve. The spool normally is maintained in the position shown by a compression spring 61, the spool being shifted to its second position by a solenoid coil 62. The solenoid winding 62 is energized by the power lines 63 and 64, line 63 being connected in common to all of the coils of the valving system. The power line 64 includes a branch line 65 leading to the opposite end of the winding 62 of the first valve 55, a control switch 66 being interposed in the branch line 65. A second branch line 67, including a switch 66, leads to the winding of the second valve 55; the remaining valves of the circuit similarly are interconnected in the electrical circuit and controlled by individual switches (not shown).

In the deenergized position of the valve 55 of the group A platens, (with switch 66 open) the hydraulic pressure passes from conduit 54, through a port 60 and through the intermediate groove 58 to the main conduit 70 as indicated by the arrows. The branch conduits 24, which communicate with the lower ends of the cylinder 17, are connected to the main conduit 70. Accordingly, fluid pressure is applied to the cylinders in a direction to shift the slide rails 13—13 upwardly into engagement with the stop screws 48, thus elevating the platens of group A to the active position shown in Figure 2. The platens remain in this position so long as switch 66 is in the open position indicated. During upward motion of the pistons 20, the hydraulic fluid is exhausted from the upper ends of the cylinders by way of the conduits 23 which lead to the main conduit 71. The exhausting fluid flows by way of the ports 60 across the upper groove 58 of the valve and by way of branch conduit 72 through the exhaust conduit 73. The valves of the individual groups of platens are identical, each communicating with similar conduits 70 and 71 for the respective sets of cylinders.

When the group A platens are to be lowered, switch 66 is closed, energizing winding 62 and causing the spool 57 to shift to its second position. The hydraulic pressure from delivery conduit 54 now flows across the intermediate groove 58 and ports 60 to the main conduit 71 and to the branch conduits 23 leading to the upper ends of the actuating cylinders 17. As the pistons are shifted downwardly, fluid is exhausted from the lower ends of the cylinders by way of the branch lines 24 to the main conduit 70. The exhausting fluid of conduit 70 flows by way of the ports 60 across the lower groove 58 of the valve spool, then by way of conduit 73 back to the reservoir.

Operation

In the manufacture of single-ply double-face board, as shown in Figure 7, the corrugations 74 are formed in the intermediate sheet during passage through the first section of the machine. After the corrugations are formed, the liquid glue is applied as at 75 to the tops of the flutes, then the liners 76 and 77 are brought into contact with the glue coated flutes. As the freshly glued sheet advances through the heating section, the ballast belt imposes just sufficient pressure to hold the liners in intimate contact with the glue coated flutes, but insufficient to compress or distort the flutes.

As explained earlier, various water base, heat-setting vegetable glues are used in the manufacture of corrugated board, a mixture of cornstarch and water being a typical example. This mixture is applied to the flutes in its raw state and is gelatinized and converted into an adhesive upon being subjected to heat. As the freshly glued board flows into the receiving end of the heating section, it is in somewhat soft pliable condition because of the moisture present in the raw glue and because of moisture absorbed in the paper stock. The moisture present in the paper fibers varies in accordance with various conditions, such as the air temperature within the plant, humidity naturally present in the atmosphere, and conditions prevailing in the corrugating and gluing section of the machine, all of which may vary during the run of material. As noted earlier, the heat given off by the platens is considerably greater than the heat needed to gelatinize and set the glue in order to drive off the moisture contained in the glue and also the moisture absorbed in the fibers of the paper stock.

On the other hand, care must be taken to prevent the application of excess heat which may damage the paper fibers. Overheating weakens the paper stock or causes cracking of the flutes; it also may cause the board to shrink or may cause warpage or curling. In other instances, overheating may create a "washboard effect," that is, it causes the liners to sag between the flutes, presenting a wavy surface which makes printing difficult or impossible.

In practicing the present invention, the operator selects a speed at which the board may be manufactured at a most efficient rate, then regulates the temperature by operation of the heat control switches 66 to commission or decommission the groups of platens in a combination which, as determined experimentally, is found best suited for the particular grade of material being processed. By way of example, a typical drying section used in practicing the invention may have up to eight or ten groups of shiftable platens along the length of the heating section, each under the control of an individual switch 66. In running a given grade of single-ply double-face boards, the operator may select a drying temperature related to the selected feed rate, for example, by shifting alternate groups of platens along the length of the machine to activate and inactivate positions. The heat is transferred from the platens primarily by direct conduction upwardly through the composite board which is in sliding connection with the active platens. The spacing or air gap of the inactive platens is sufficient to substantially inhibit the transfer of heat except for a limited degree of radiant heat. If the board issuing at the downstream end shows evidence of overheating, then the operator compensates quickly by lowering one or more platen groups to inactive position without changing the speed of the machine. On the other hand, additional heat may be quickly applied by raising one or more platens to active position, if the condition of the board so indicates. Controlling the temperature in this manner improves the product and greatly diminishes the waste of material which, under conventional operation, may be very great, due to the high lineal speed of the material. Moreover, the other sections of the machine, which are driven at the same speed as the drying section, naturally function far more efficiently if operated at a substantially constant speed according to the present method.

In manufacturing double-ply corrugated board, as shown in Figure 8, the corrugating and gluing section is arranged to corrugate and glue the flutes of two intermediate sheets 78 and 80 which are advanced with an internal liner 81 and two external liners 82—82. After the glue is applied to the flutes as at 83, the three liners are brought into contact with the flutes and the composite sheet is advanced through the drying section in the same manner as the single-ply board. Since the two-ply material is approximately twice the thickness of the single-ply, the ballast belt and its rollers operate at a correspondingly higher plane.

In running the three-ply material shown in Figure 9, the apparatus is arranged to corrugate and glue an additional corrugated sheet, as indicated at 84, along with an additional liner sheet 85. It will be apparent that the two and three ply sheets, because of their increased thickness, require the application of a greater amount of heat to set the glue and drive off the absorbed moisture from the multiple sheets.

As pointed out earlier, a modern corrugating machine may be arranged to advance the board at a speed up to 750 feet per minute, depending upon the length of the drying section. Single-ply board and other light weight materials, which dry most rapidly, are fed at the upper speed ranges. In running the two-ply and three-ply materials, the additional thickness naturally requires slower speeds in order to increase the time period during which the material is exposed to the drying temperature. In practicing the invention, the multiple ply material is advanced at a selected constant speed best suited for efficient production, and the temperature is regulated accurately by shifting the platens as may be required. The same procedure is followed in the manufacture of other materials which require the application of varying temperatures during advancement through the drying section.

*Modified heat control apparatus*

The modified structure shown in Figures 11 and 12 provides relative shifting motion of the advancing board and platens according to the principles of the invention; however, in this example, the platens 6 are mounted in a fixed plane, and the corrugated board 1 is raised or lowered relative to the top surface 25 of the platens. For this purpose, the idler rollers 40, which reside between the platens, have their opposite ends journalled in guide blocks 86—86, which are slidable vertically in slide ways 87 formed in the side plates 3—3. Each guide block 86 is provided with a hydraulic cylinder 17 seated upon respective cross members 5, and having a piston rod 18 attached to the guide block. The cylinders are actuated by the branch conduits 23 and 24 which are in communication with reversing valves 55 of the control system, as described above. In the example illustrated, the cylinders are arranged in pairs, each pair of cylinders being actuated by an individual control switch 66 for operation in unison. The platens 6 are mounted in their fixed plane upon stationary side rails 88 rigidly attached to the side plates 3.

The rollers 40 are shown in elevated or inactive position in the drawings, supporting the corrugated board for advancement along a plane spaced upwardly as at 40 above the platens. This space corresponds to the downward spacing of the platens, previously indicated at 43 in Figure 2. In the lowered position of the rollers (not shown), the tops of the rollers reside slightly below the top surface 25 of the platens, such that the board advances in sliding contact with the platens in the same manner as shown in Figure 3. It will be understood that the modified apparatus utilizes a ballast belt 7 and ballast rollers 10, the rollers being journalled in bearing blocks 11 for vertical shifting motion, as described earlier. Accordingly, the ballast belt is elevated or lowered with the rollers 40 as the apparatus is shifted to active or inactive position.

It will be understood that the rollers may be shifted in various combinations to active or inactive position along the machine to provide a heating action best suited to the type of material being run, the material being sufficiently flexible to undulate as it flows from the platen surfaces upwardly across the elevated rollers. In an alternate form, the rollers 40 may be segregated into groups for collective operation as described with reference to the platen shifting the apparatus. In this event, the groups of rollers may be journalled upon a slide rail structure similar to that described with reference to Figure 2.

The ballast belt 7 is fabricated from fibrous material, such as woven cotton fabric, and must be protected from excessive heat. According to conventional practice, the heating section is provided with means (not shown) for shifting the belt to a plane elevated above the platens when the machine is shut down. This prevents the belt from resting upon the platens with attendant damage due to the heat which dissipates slowly from the platens after the steam supply is shut off.

According to the present invention, it is unnecessary to shift the ballast belt; instead, the switches 66 are actuated to lower all of the platens to their inactive position below the belt, or in the modified structure, to shift the idler rollers 40 and belt to a plane above the fixed platens.

Having described my invention, I claim:

1. The process of drying corrugated paper board containing absorbed moisture comprising the steps of advancing the corrugated board at a substantially constant lineal speed relative to a series of platens having upper heating surfaces residing parallel with the plane of travel of the corrugated board and in contiguous relationship therewith, maintaining said platens at a substantially constant temperature during advancement of the corrugated board, and controlling the degree of heat acting upon the advancing board by periodically shifting selected platens of said series along lines angular to the plane of travel of the corrugated board to an inactive position with said heating surfaces spaced from the advancing board, thereby to reduce the transfer of heat to the board by said selected platens, the number of platens shifted to said inactive position being related to the condition of the board and to the lineal speed of advancement of the board to dry the same without overheating during continuous advancement relative to said series of platens.

2. The process of drying corrugated paper board containing absorbed moisture comprising the steps of advancing the corrugated board lineally at a substantially constant speed along a plane of travel relative to the upper surface of a series of platens, heating said series of platens to a temperature which is greater than that required to drive off the moisture from the corrugated board during continuous advancement at said substantially constant lineal speed, maintaining the platens substantially at said temperature, and varying the temperature acting upon the lineally advancing corrugated board by shifting said platens in segregated groups periodically toward or away from the plane of travel of said corrugated board in accordance with the amount of moisture absorbed in the corrugated board.

3. The process of drying corrugated paper board containing absorbed moisture comprising the steps of advancing the corrugated board lineally at a substantially constant speed along a plane of travel relative to a series of platens, heating said platens to a temperature which is greater than that required to drive off the moisture from the corrugated board during advancement at said substantially constant lineal speed, maintaining the platens substantially at said temperature, and continuously controlling the temperature acting upon the corrugated board by periodically shifting the said platens in segregated groups by power motors to active or inactive positions relative to the plane of travel of said corrugated board in accordance with the dryness of the advancing corrugated board, said active platens being in sliding contact with the surface of the board and said inactive platens being spaced therefrom, the number of platens shifted to said active position being related to the speed of advancement of the board to drive off the absorbed moisture without overheating the board during advancement along said series of platens.

4. The process of drying paper board containing absorbed moisture comprising the steps of advancing the moist paper board lineally at a given speed along a plane of travel relative to a series of platens arranged in groups along said plane of travel, said groups of platens being shiftable transversely relative to the plane of travel of the board to heating or non-heating positions, heating said platens to a temperature which is greater than that required to drive off said absorbed moisture during continuous advancement of the paper board with all of the groups of platens in heating position, maintaining the platens substantially at said temperature, and reducing the heat which is applied to the board during continuous advancement along said groups of platens by periodically shifting selected groups of platens transversely to said non-heating position, whereby the moisture is driven from said board by repeated applications of heat thereto during continuous advancement along the groups of platens which are shifted to said heating position.

5. The process of drying paper board containing absorbed moisture comprising the steps of advancing the moist paper board lineally at a substantially constant speed along a plane of travel relative to a series of flat contact surfaces residing parallel with one another along said plane of travel, applying regulated pressure upon the moist board in a direction to maintain the advancing board in sliding contact with the flat contact surfaces along the plane of travel, heating said flat contact surfaces above a temperature which is necessary to drive off said absorbed moisture from the advancing board, maintaining said contact surfaces substantially at said temperature, and controlling the heat which is applied to the board during advancement along said heated contact surfaces by shifting selected contact surfaces of said series transversely in spaced relationship to the surface of the advancing board to inhibit the transfer of heat from said flat contact surfaces to the advancing board, whereby the board advances at said substantially constant lineal speed in sliding contact with a sufficient number of heated platens to drive off the absorbed moisture by repeated applications of heat to the advancing board.

6. The process of drying paper board containing absorbed moisture comprising the steps of advancing the moist paper board lineally at a given speed, supporting the advancing moist board at a fixed plane of travel relative to a series of platens, heating said platens above a temperature which is necessary to drive off said moisture during advancement relative to said series of platens, maintaining the platens substantially at said temperature, periodically shifting said platens selectively by power motors to active or inactive positions relative to said plane of travel at which the advancing board is supported, said periodic shifting motion being applied to the selected platens in accordance with the changing condition of the continuously advancing moist paper board, the line of shifting motion of said platens being angular to said plane of travel of the board, the platens which are shifted to said active position being in sliding contact with said board for heating the same to a temperature sufficient to drive off the moisture absorbed therein, the platens which are shifted to said inactive position being spaced from the plane of travel a sufficient distance to substantially inhibit the transfer of heat from the platens to the board, whereby the collective platens in said active position provide sufficient heat to dry the moist board during advancement thereof at said given speed along said series of platens but insufficient to overheat the advancing board.

7. In the manufacture of corrugated paper board in which a raw, water base heat-setting liquid glue is applied to the contacting surfaces of a corrugated sheet and at least one liner sheet, the process of driving off the moisture absorbed in the freshly glued corrugated board and concurrently heat-setting said raw glue, said process comprising the steps of advancing the freshly glued corrugated board lineally while in contact with a series of heat transfer elements, heating said heat transfer elements above the temperature required to drive off the absorbed moisture from the corrugated board and above a temperature required to heat-set the raw glue, maintaining the heat transfer elements substantially at said temperature and protecting the advancing corrugated board from overheating during advancement along said series of heat transfer elements by periodically shifting selected elements of said series transversely to spaced relationship with the surface of the advancing corrugated board to inhibit the transfer of heat by the heat transfer elements to the board in accordance with the condition of the advancing board.

8. In the manufacture of corrugated paper board in which a raw, water base heat-setting liquid glue is applied to the contacting surfaces of a corrugated sheet and at least one liner sheet, the process of driving off the moisture absorbed in the freshly glued corrugated board and concurrently heat-setting said raw glue, said process comprising the steps of advancing the freshly glued corrugated board lineally at a constant speed relative to a series of platens, applying sufficient pressure to the advancing corrugated board to hold the same in contact with said series of platens, heating said platens above the temperature required to drive off the absorbed moisture from the corrugated board and above a temperature required to heat-set the raw glue, maintaining the platens substantially at said temperature, and protecting the corrugated board from overheating during passage along said platens by periodically shifting selected platens of said series transversely to spaced relationship with the surface of the advancing corrugated board to reduce the transfer of heat from the platens to the board in accordance with the condition of the board.

9. The process of drying freshly glued corrugated board containing absorbed moisture comprising the steps of advancing the freshly glued corrugated board lineally at a substantially constant speed relative to a longitudinal series of platens, said platens having heated contact surfaces residing in a fixed common plane, maintaining said contact surfaces at a substantially uniform temperature during advancement of the corrugated board across said surfaces, and regulating the amount of heat transferred from the heated platen surfaces to the corrugated board by shifting the corrugated board outwardly from the heated surface of the platens at points spaced longitudinally along the series of platens, whereby the corrugated board advances with portions thereof in sliding contact with the heated surface of the platens and with other portions thereof in spaced relationship to the heated surface of the platens to control the amount of heat which is transferred to the corrugated board during advancement at said substantially constant speed along said series of platens.

10. A drying apparatus for driving off absorbed moisture from a freshly glued corrugated board as said board issues lineally from a corrugating machine, said drying apparatus comprising, a series of heated platens spaced apart from one another longitudinally along a generally common horizontal plane, board-support rollers journalled between said heated platens along said common horizontal plane, respective reversible power means connected to said platens for shifting the platens selectively to a heating or non-heating position relative to said rollers, said freshly glued corrugated board advancing lineally in sliding contact with the platens which are shifted to said heating position, said rollers supporting the advancing corrugated board when the platens are shifted to said non-heating position, and control means connected to said reversible power means for shifting said platens selectively to said heating or non-heating positions, thereby to regulate the amount of heat acting upon the corrugated board during lineal advancement thereof relative to the platens in said heating and non-heating positions.

11. A variable heat drying apparatus for driving off moisture from freshly glued corrugated board as the same advances lineally from a corrugating machine, said drying apparatus comprising, a longitudinal frame, a series of rollers spaced apart from one another along said frame and adapted to support the corrugated board at a generally horizontal plane for lineal advancement along said frame, ballast means disposed above said rollers, said ballast means applying yieldable downward pressure upon the corrugated board and advancing the same, a series of heated platens disposed longitudinally along said frame, guide means slidably connecting the platens to said frame for movement relative to the plane of said rollers, respective reversible power means connected to said platens, and respective control means connected to said power means for energizing the same selectively in forward or reverse directions, said platens residing parallel to the plane of travel of the corrugated board as delineated by said rollers, said power means shifting the heated platens selectively to heating or non-heating positions relative to the plane of the rollers, said platens adapted to slidably support the advancing corrugated board when in said heating position, said rollers adapted to support the advancing corrugated board when the platens are shifted to said non-heating position, thereby controlling the amount of heat transferred to the advancing board by the platens in said heating and non-heating positions.

12. A variable heat drying apparatus for driving off moisture from freshly glued corrugated board as the same advances lineally from a corrugating machine, said drying apparatus comprising, a longitudinal frame, a series of rollers carried by said frame in a common plane and adapted to support the corrugated board at a generally horizontal plane for lineal advancement along said frame, a series of heated platens disposed longitudinally along said frame, platen guide means slidably connecting the platens to said frame for movement relative to the common plane of the said rollers, respective reversible power means connected to said platens, respective control means connected to said power means for energizing the same in forward or reverse directions and thereby shifting the heated platens selectively to active or inactive positions relative to the common plane of the rollers, said platens adapted to slidably support the advancing board when in said active position, said rollers adapted to support the advancing board when the platens are shifted to said inactive position, and stop means carried by the frame and engageable with the platens which are shifted to said active position, said stop means locating said active platens in a plane to slidably support the advancing board, whereby heat is transmitted to the advancing board by the platens which are shifted to said active position.

13. A variable heat drying apparatus for driving off moisture from freshly glued corrugated board which advances from a corrugating machine, said drying apparatus comprising a longitudinal frame, a series of idler rollers having opposite ends rotatably journalled in said frame and residing in a common plane, said rollers adapted to support the corrugated board for advancement along a horizontal plane of travel, a series of platen-mounting structures slidably connected to said frame along opposite sides and residing along said frame, a group of heated platens mounted transversely upon each of said platen-mounting structures, said groups of platens residing parallel with the common plane of the idler rollers, power devices connected to said platen-mounting structures for shifting respective groups of platens selectively to active or inactive positions in a direction angular to the common plane of the idler rollers, respective control means connected to said power devices for regulating the same, the groups of platens in said active position slidably supporting the advancing corrugated board for transfer of heat from the platens to the board, said idler rollers adapted to support the advancing corrugated board when said platens are shifted to said inactive position, whereby the amount of heat acting upon the corrugated board is regulated by shifting said groups of platens selectively to said active or inactive positions.

14. A variable heat drying apparatus for driving off moisture from freshly glued corrugated board which advances lineally from a corrugating machine, said drying apparatus comprising, a longitudinal frame, a series of idler rollers spaced apart from one another longitudinally along said frame, said rollers residing in a common horizontal plane and delineating a tracking surface for supporting the lineally advancing corrugated board, a plurality of platen-mounting structures residing along said longitudinal frame, a respective group of heated platens mounted on each of said platen-support structures, said platens spaced apart from one another and residing between the longitudinally spaced idler rollers, said platens having heated top surfaces residing in a common plane parallel with the common plane of the idler rollers, said idler rollers and platen-mounting structures being mounted for shifting motion relative to one another along a vertical path to active or inactive positions along said frame, the heated surfaces of said platens residing in a plane above the common horizontal plane of the idler rollers in the active position, whereby the corrugated board advances in sliding contact with said heated platen surfaces, said heated platen surfaces residing in a plane spaced below said common horizontal plane in said inactive position, the corrugated board thereby being subjected to repeated applications of heat and pressure during continuous advancement, respective reversible power means interconnecting the platen-mounting structures and idler rollers for selectively shifting the same relatively to said active or inactive positions along said longitudinal frame, and respective control means connected to the reversible power means for energizing the same in forward or reverse directions, thereby to regulate the amount of heat which acts upon the corrugated board during advancement thereof along said drying apparatus.

15. A variable heat drying apparatus for driving off moisture from freshly glued corrugated board which advances lineally from a corrugating machine, said drying apparatus comprising, a longitudinal frame, a series of platens extending transversely across said longitudinal frame and spaced longitudinally from one another, said platens having heating surfaces residing in a fixed common plane, a series of guide rollers located along the said longitudinal frame and residing between said spaced platens, shiftable guide elements connected to the frame at opposite sides and rotatably journalling said rollers, respective reversible power devices connected to said guide elements for shifting the guide elements and rollers selectively to an elevated or lowered position and respective control means connected to said power devices for regulating the same, said guide rollers in elevated position supporting the advancing board at an elevation above the heated surfaces of said platens, said rollers in lowered position residing below the common plane of said heated platen surfaces, whereby said corrugated board advances in sliding contact therewith, said shiftable rollers thereby controlling the amount of heat which acts upon the corrugated board during advancement thereof along said heated platen surfaces.

References Cited in the file of this patent
UNITED STATES PATENTS

| | | |
|---|---|---|
| 982,176 | Dunfee | Jan. 17, 1911 |
| 1,179,941 | Langston | Apr. 18, 1916 |
| 1,924,100 | Barker | Aug. 29, 1933 |
| 2,475,789 | Kunz | July 12, 1949 |